United States Patent
Kato et al.

(10) Patent No.: US 7,351,516 B2
(45) Date of Patent: Apr. 1, 2008

(54) OPTICAL INFORMATION RECORDING MEDIUM

(75) Inventors: Masaki Kato, Kanagawa (JP); Katsuyuki Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 440 days.

(21) Appl. No.: 10/699,878

(22) Filed: Nov. 4, 2003

(65) Prior Publication Data
US 2004/0115559 A1    Jun. 17, 2004

(30) Foreign Application Priority Data
Nov. 6, 2002    (JP) ............................. 2002-322306

(51) Int. Cl.
*G11B 7/24*    (2006.01)
(52) U.S. Cl. ................ 430/270.13; 430/945; 428/64.5; 369/288; 369/275.2
(58) Field of Classification Search .................... None
See application file for complete search history.

(56) References Cited

U.S. PATENT DOCUMENTS

| | | | |
|---|---|---|---|
| 5,732,062 A | 3/1998 | Yokoi et al. | |
| 5,974,025 A | 10/1999 | Yamada et al. | |
| 6,153,355 A * | 11/2000 | Takahashi et al. | 430/270.13 |
| 6,280,810 B1 | 8/2001 | Nakamura et al. | |
| 6,319,368 B1 | 11/2001 | Ide et al. | |
| 6,373,802 B1 | 4/2002 | Hattori et al. | |
| 6,388,978 B1 | 5/2002 | Ogawa et al. | |
| 6,445,669 B1 | 9/2002 | Hattori et al. | |
| 6,770,346 B2 * | 8/2004 | Harigaya et al. | 428/64.1 |
| 6,790,592 B2 * | 9/2004 | Harigaya et al. | 430/270.13 |
| 2001/0003641 A1 * | 6/2001 | Kunitomo et al. | 430/270.13 |
| 2001/0017833 A1 | 8/2001 | Yamada et al. | |
| 2001/0021154 A1 | 9/2001 | Katoh et al. | |
| 2002/0021594 A1 | 2/2002 | Nakamura et al. | |
| 2002/0075789 A1 | 6/2002 | Katoh et al. | |
| 2002/0098445 A1 * | 7/2002 | Harigaya et al. | 430/270.13 |
| 2002/0110063 A1 | 8/2002 | Yamada et al. | |
| 2002/0145963 A1 | 10/2002 | Narumi et al. | |
| 2002/0155248 A1 | 10/2002 | Ito et al. | |

(Continued)

FOREIGN PATENT DOCUMENTS

EP    1001415    *    5/2000

(Continued)

OTHER PUBLICATIONS

Machine translation of JP 2002-09650.*

*Primary Examiner*—Martin Angebranndt
(74) *Attorney, Agent, or Firm*—Dickstein Shapiro. LLP

(57) ABSTRACT

An optical information recording medium, especially a CD-RW medium, that can undergo direct overwriting at high speed is disclosed. The optical information recording medium includes a transparent substrate, at least a recording layer and a reflective layer on or above the substrate and is capable of performing at least one of recording, erasing and rewriting information by irradiating and scanning with focused light to thereby form and/or erase recording marks on the recording layer. The recording layer contains an alloy and/or an intermetallic compound mainly containing Ga, Ge, Sb, and Te in a compositional ratio represented by the following formula:

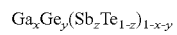

$$Ga_xGe_y(Sb_zTe_{1-z})_{1-x-y}$$

wherein x, y, and z each represent an atomic ratio of a positive real number less than 1 and satisfy the following conditions: $0.02 \leq x \leq 0.06$, $0.01 \leq y \leq 0.06$, $0.80 \leq z \leq 0.86$, $x \geq y$, and $x+y \leq 0.1$.

10 Claims, 5 Drawing Sheets

U.S. PATENT DOCUMENTS

| | | |
|---|---|---|
| 2003/0008236 A1 | 1/2003 | Yamada et al. |
| 2003/0026195 A1 | 2/2003 | Kato |
| 2003/0043712 A1 | 3/2003 | Nakamura et al. |
| 2003/0044719 A1 | 3/2003 | Katoh et al. |
| 2003/0214902 A1 | 11/2003 | Yamada et al. |
| 2005/0254410 A1* | 11/2005 | Kibe et al. ............... 369/275.1 |

FOREIGN PATENT DOCUMENTS

| | | | |
|---|---|---|---|
| EP | 1056077 | * | 11/2000 |
| EP | 1058248 | * | 12/2000 |
| EP | 1058249 | * | 12/2000 |
| EP | 1096485 | * | 5/2001 |
| EP | 1193696 | * | 4/2002 |
| EP | 1260973 | * | 11/2002 |
| JP | 2002-096560 | * | 4/2002 |
| JP | 2002-331758 | * | 11/2002 |
| JP | 2002-347349 | * | 12/2002 |
| JP | 1280142 | * | 1/2003 |
| JP | 2003-091867 | * | 3/2003 |
| JP | 2003-091871 | * | 3/2003 |
| JP | 2003-094819 | * | 4/2003 |
| JP | 2003-211849 | * | 7/2003 |
| JP | 2003-246140 | * | 9/2003 |
| JP | 2003-257077 | * | 9/2003 |

* cited by examiner

FIG. 1
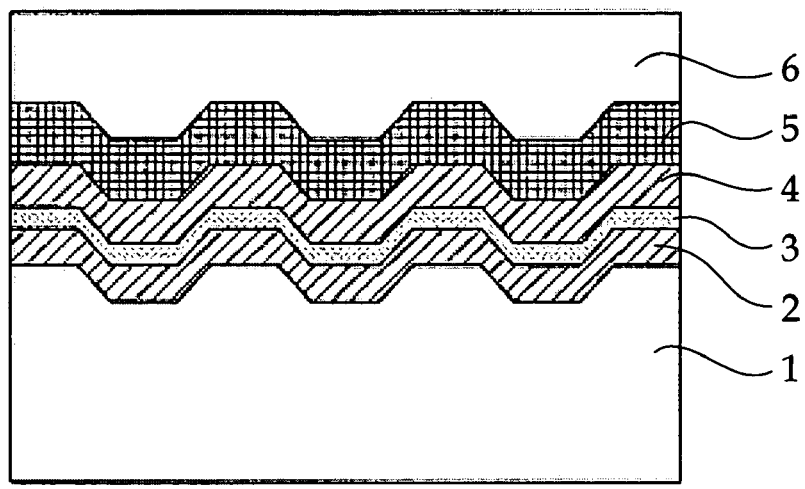
FIG. 2A
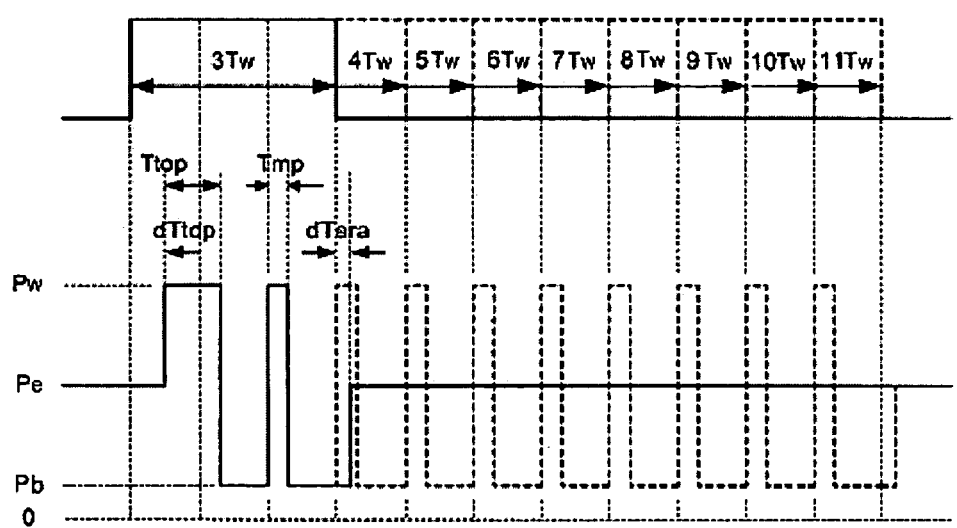
FIG. 2B

OPTICAL INFORMATION RECORDING MEDIUM

BACKGROUND OF THE INVENTION

1. Field of the Invention

The present invention relates to phase-change optical information recording media and especially to compact disc rewritable CD–RW media and processes for recording information thereon.

2. Description of the Related Art

In compact discs (CDs) and digital versatile discs (DVDs), information is reproduced based on a change in intensity of light reflected from a medium. In read only memory (ROM) optical discs, there is a substrate that has depressions and protrusions on its surface to cause a phase difference of the reflected light, thus interference occurs to induce the change in intensity.

In recordable media, micro domains having different optical properties are formed in a recording layer arranged on a substrate of the media to induce the change in intensity. The recording layer generally comprises, for example, an organic coloring matter in CD recordable (CD–R) and DVD recordable (DVD+R) discs, or a phase-change recording material in CD rewritable (CD–RW) and DVD rewritable (DVD+RW) discs.

In any case, information is recorded on the discs by irradiation of focused light to the vicinity of the recording layer, which changes the state of the micro domains, and the difference in optical properties of such changed micro domains induces phase difference or intensity difference.

The use of a phase change material in the recording layer allows one to form and erase recording marks, since the phase change between a crystalline phase and an amorphous phase used in recording is reversible. The phase change between the crystalline phase and the amorphous phase can be controlled based on thermal hysteresis including quenching (rapid cooling) and annealing (slow cooling) of the material, and information can be recorded and erased by modulation of intensity of an irradiated light beam, and recording apparatus using the phase change can be produced at low cost. In addition, the recorded information can be reproduced in a read-only apparatus (player), and the phase change recording systems have been widely employed.

Increasing demands have been made on optical discs to have larger capacity and to operate at higher speed with an increasing capacity of electronic information and with an increasing speed of information processing. Recording media having a larger density are the most effective means to satisfy such demands. To increase the density of media, for example, an optical system for use in recording and reproducing information should be changed to have an increased numerical aperture NA or a shorter wavelength, or a modulation system should be changed. Such change can be seen in, for example, the transition from CD to DVD, the capacity of which is much higher than CD. However, conventional CD reproducing apparatus cannot reproduce or read information on such high-density DVD media. The incompatibility in reproduction must be avoided in commercially distributed media. If emphasis is put on compatibility, increasing the speed of operation becomes the biggest challenge.

It is believed that rewritable optical information recording media using a phase-change material are difficult to have a higher recording and/or reproducing speed as compared with write once media using a coloring matter on which information can be recorded only once. To form recording marks on rewritable optical discs at higher speed, a light beam with a higher recording power may be irradiated as in media using a coloring matter. At high speed, however, the recording marks once formed cannot be erased in the media using the phase-change material. This is because scanning at higher speed cannot create "annealing conditions" necessary for forming a crystalline phase in which the recording marks are erased.

Accordingly, increase in scanning speed of phase-change rewritable optical discs is not so much as in optical discs using a coloring matter. For example, CD–R media now available can be recorded at 40-speed (scanning speed of 48 m/s, channel bit rate of 1.7 Gbps), but CD–RW media can be recorded at 10-speed (scanning speed of 12 m/s, channel bit rate of 432 Mbps).

Patent documents which are of public knowledge prior to the filing of the present application are as follows.

Japanese Patent Application Laid-Open (JP-A) No. 2000-313170 discloses an optical information recording medium using, as a material for a recording layer, $((Sb_xTe_{1-x})_yGe_{1-y})_zM_{1-z}$, wherein x, y and z satisfy the following condition: $0.7 \leq x \leq 0.9$, $0.8 \leq y < 1$, and $0.88 \leq z < 1$, and M represents In and/or Ga. However, the compositional ratios as specified in the publication are in wide ranges, and the examples described therein shows only a recording layer where M is In and does not show data for verifying the advantages or effects of the use of Ga as M. The publication also does not describe the necessity of Ga and great differences between Ga and In, in contrast to the-present invention. In addition, the publication does never refer to ensuring the storage reliability and improving direct overwriting properties at higher scanning speed of 20 m/s or higher, improvement of which is one of the objects of the present invention.

JP-A No. 2001-56958 discloses an optical information recording medium having a recording layer mainly comprising GeSbTe and further comprising a metal element selected from a wide variety of metal elements and is capable of overwriting at high speed. In Example 16 of the disclosure, an optical information recording medium using $Ga_{0.06}Ge_{0.06}Sb_{0.68}Te_{0.22}$ is disclosed. However, the term "high speed" as used in the publication is at highest 10 m/s as specified in, for example, its claim 31. The publication does not teach the improvement. in overwriting properties at a scanning speed of 20 m/s or higher as in the present invention, and the alloy composition described in Example 16 is out of the ranges specified in the present invention. In addition, it neither discloses nor indicate the effectiveness of Ga, in contrast to the present invention.

JP-A No. 2001-236690 and Japanese Patent (JP-B) No. 3255051 (JP-A No. 10-172179) each disclose an optical information recording medium having a recording layer mainly comprising SbTe and further comprising an element selected from a wide variety of elements. However, they lack the concrete description on GaGeSbTe alloys and neither disclose nor indicate the direct overwriting properties at a scanning speed of 20 m/s or higher, improvement of which is one of the objects of the present invention, and the effectiveness of Ga which is pointed out by the present invention.

JP-B No. 2629749 (JP-A No. 01-138634) discloses an optical information recording medium having a recording layer mainly comprising GaGeSbTe. However, the recording layer mainly comprises a GeTe alloy or intermetallic compound and thereby has clearly different compositional ranges and properties from the materials mainly comprising a Sb—Te eutectic alloy and further comprising trace amounts of metal elements as in the present invention.

Accordingly, an object of the present invention is to provide an optical information recording medium, especially a CD-RW medium, that can undergo direct overwriting at high speed and to provide a process for recording information thereon.

SUMMARY OF THE INVENTION

Specifically, the present invention provides an optical information recording medium including a transparent substrate, at least a recording layer and a reflective layer, the optical information recording medium being capable of performing at least one of recording, erasing and rewriting information by irradiating and scanning with focused light to thereby form and/or erase recording marks on the recording layer, wherein the recording layer contains at least one of alloys and intermetallic compounds each mainly containing Ga, Ge, Sb, and Te in a compositional ratio represented by the following formula:

$$Ga_xGe_y(Sb_zTe_{1-z})_{1-x-y}$$

wherein x, y, and z each represent an atomic ratio of a positive real number less than 1 and satisfy the following conditions:

$$0.02 \leq x \leq 0.06$$

$$0.01 \leq y \leq 0.06$$

$$0.80 \leq z \leq 0.86$$

$$x \geq y$$

$$x+y \leq 0.1$$

The present invention also provides a sputtering target for use in the production of optical information recording media, containing at least one of alloys and intermetallic compounds each mainly containing Ga, Ge, Sb, and Te in a compositional ratio represented by the following formula:

$$Ga_xGe_y(Sb_zTe_{1-z})_{1-x-y}$$

wherein x, y, and z each represent an atomic ratio of a positive real number less than 1 and satisfy the following conditions:

$$0.02 \leq x \leq 0.06$$

$$0.01 \leq y \leq 0.06$$

$$0.80 \leq z \leq 0.86$$

$$x \geq y$$

$$x+y \leq 0.1$$

The present invention further provides a process for initialization of an optical information recording medium, including irradiating and scanning the optical information recording medium of the present invention with a laser beam having power consumption of 500 mW or more at a scanning speed of 1 to 2.5 m/s to thereby initialize the optical information recording medium. The initialization is an operation for converting information recording areas of a recording layer of a medium into crystalline phase before use.

Additionally, the present invention provides a process for recording on an optical information recording medium, including irradiating and scanning the optical information recording medium with a laser beam, wherein recording marks are formed by irradiating and scanning the optical information recording medium with a pulse having an intensity of Pw and a pulse having an intensity of Pb alternately, wherein a number m of the pulses having an intensity of Pw satisfies one of the following conditions: n=2 m when n is an even number, and n=2 m+1 when n is an odd number, where m is a natural number equal to n or less and n is a natural number, provided that a recording mark length is represented by nTw, wherein Tw is a reference clocking period. The recording marks are erased by irradiating and scanning the optical information recording medium with light having a constant intensity of Pe. Also, Pw, Pe, and Pb satisfy the following condition: Pw>Pe>Pb.

Further objects, features and advantages of the present invention will become apparent from the following description of the preferred embodiments with reference to the attached drawings.

BRIEF DESCRIPTION OF THE DRAWINGS

FIG. 1 is a schematic sectional view showing an example of an optical information recording medium according to the present. invention;

FIGS. 2A and 2B are each an illustrative diagram of an example of a technique of applying light with modulated intensity, in which FIG. 2A schematically illustrates an example of an amorphous mark to be recorded, and FIG. 2B illustrates an example of an irradiation pattern (recording strategy) for use in recording;

DESCRIPTION OF THE PREFERRED EMBODIMENTS

Figure 3:
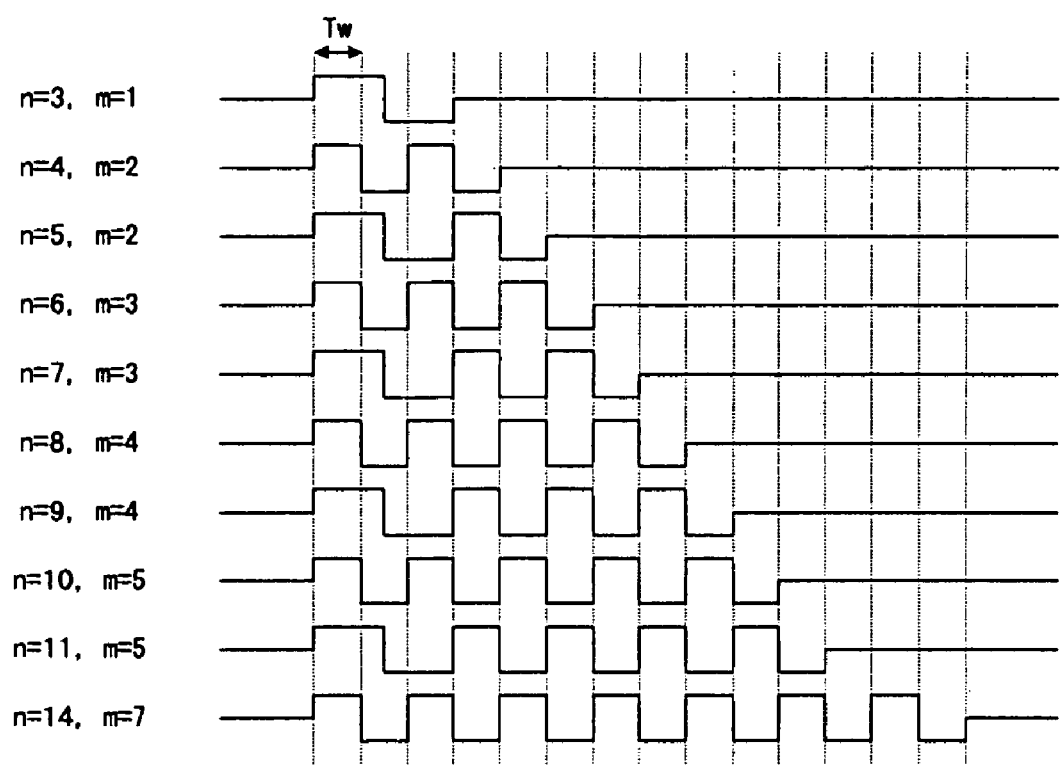
FIG. 3 is a diagram showing an example of an illustrative strategy for reducing the number of pulses.

The present invention will be illustrated in detail below.

FIG. 1 is a schematic sectional view of an example of an optical information recording medium according to the present invention. The optical information recording medium should essentially have a transparent substrate 1, at least a recording layer 3 and a reflective layer 5 arranged on or above the transparent substrate 1. Light for recording, erasing, and/or reproducing information enters the optical information recording medium from the substrate 1 illustrated underside of the figure. The substrate 1 preferably has a high transmittance in wavelengths of the light for recording, erasing, and/or reproducing and has high strength. Materials for the substrate 1 include, for example, glass, ceramics, and resins. Among them, resins are preferred for their high strength, low production cost, and excellent productivity, of which acrylic resins and polycarbonate resins are more preferred for their high strength and low birefringence.

The substrate 1 may have a guide groove for recording and reproducing light. The dimensions such as depth and width of the guide groove are optimized depending on, for example, the wavelength of light for recording and reproducing, numerical aperture (NA) and aberration of an objective lens for focusing. For example, in CD-RW media using an optical system with a wavelength of 780 nm and NA of 0.50, the groove width and the groove depth are preferably from 500 to 650 nm and from 30 to 50 nm, respectively, and are more preferably from 580 to 610 nm and from 32 to 44 nm, respectively. The guide groove may wobble, and preformatted address information may be encoded in the wobbling. An address preformatting system includes, for example, an absolute time in pregroove (ATIP) system in CD-R media and CD-RW media, in which the frequency of the wobbling is modulated, and an address in pregroove (ADIP) system in DVD+RW media and DVD+R media, in which the phase of the wobbling is modulated.

A material for the recording layer 3 should be an alloy and/or intermetallic compound mainly comprising GaGeSbTe. The content of the alloy and/or intermetallic compound in the recording layer 3 is preferably 90 atomic percent or more, and more preferably 96 atomic percent or more. When the recording layer 3 contains impurities or additives in an amount of 10 atomic percentage or more, recording areas in the recording layer 3 may not be recrystallized at a sufficiently high speed and the recorded information may not be erased satisfactorily at high scanning speed. In addition, the alloy and/or the intermetallic compound must have a compositional ratio represented by the following formula:

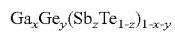

wherein x, y, and z each represent an atomic ratio of a positive real number less than 1 and satisfy the following conditions:

$$0.02 \leq x \leq 0.06$$

$$0.01 \leq y \leq 0.06$$

$$0.80 \leq z \leq 0.86$$

$$x \geq y$$

$$x+y \leq 0.1$$

A base material for the recording layer is an eutectic composition of SbTe, i.e., $Sb_{0.7}Te_{0.3}$. The basic properties of the optical information recording medium can be controlled by controlling the proportion z of Sb to Te in this system. By increasing z, the recrystallization rate can be increased and the layer can be crystallized even at high scanning speed. Accordingly, amorphous marks can be erased at high speed, and direct overwriting, namely overwrite without erasing operation, can be achieved. To achieve direct overwriting at a speed of 28.8 m/s to 33.6 m/s corresponding to the 24× speed in CD media, the ratio z must be 0.80 or more, and more preferably 0.815 or more. In contrast, an excessively high z may decrease the stability of the amorphous marks, although it may further improve the overwriting properties at high speed. This is remarkable even if the material further contains the additional elements mentioned below, and the ratio z must not exceed 0.86 to ensure a storage life of 1000 hours or more at 70° C. This finding is clearly distinguished from the finding that the ratio z is optimally from 0.7 to 0.75 in conventional 10× speed CD-RW media.

By adding additional elements to SbTe, the stability of the amorphous marks can be improved. Practically used materials comprising a SbTe eutectic mixture and further comprising additional element(s) include, for example, GeInSbTe alloys further comprising Ge and In, AgInSbTe alloys further comprising Ag and In, and AgGeInSbTe alloys further comprising Ag, Ge, and In. However, these materials for a recording layer show markedly decreased storage reliability when the ratio z is set at relatively high to increase the crystallization rate. Specifically, these materials show good properties in recording at a scanning speed of 14 m/s or less but cannot show such good properties at higher scanning speed.

In AgInSbTe, GeInSbTe, and AgGeInSbTe materials, a sufficiently high crystallization rate and the storage reliability can be obtained concurrently by increasing the amount of In. However, an increased amount of In may elevate the crystallization temperature, and the resulting optical information recording medium cannot be significantly initialized using a high-power laser beam. A medium comprising such a recording material having a high crystallization temperature varies in its reflection ratio, produces reproducing signals with noise components, thus inviting increased jitter and/or errors. The medium has therefore decreased reliability.

To solve these problems, use of Ga, a congeneric element, instead of In is effective. Thus, the recording layer can have a high crystallization rate and can avoid an increased crystallization temperature. Information can be recorded thereon at high scanning speed of 28.8 m/s corresponding to the 24× speed in CD media or at 33.6 m/s when the basic linear velocity is set at 1.4 m/s, the crystallization temperature can be suppressed to 200° C. or lower, and recording areas in the recording layer can be easily initialized.

Thus, a GaSbTe recording layer is suspected to be effective to yield recording at high speed and easy initialization concurrently. However, the GaSbTe recording layer still has low stability of recorded marks. Specifically, when recorded amorphous marks are kept at 70° C., they are crystallized and disappear within 1000 hours.

An effective solution to this problem is the addition of Ge. By adding Ge, the temperature-dependency of crystallization can be increased. The crystallization rate at high temperatures of 200° C. or higher can be increased and, concurrently, that at around 70° C. can be decreased. Thus, the medium can have excellent erasing properties at high speed, namely, excellent overwriting properties and concurrently have high stability of recorded marks.

The compositional ratios x and y of Ga and Ge must be within the above-specified ranges, and must satisfy the following condition: x+y≤0.1. Excessive amounts of Ge and Ga cause excessively high optical absorption of the recording layer, and the medium has decreased reflection ratio. Thus, reproducing signals have insufficient absolute amplitude, deteriorating the reliability of the medium.

The direct overwriting properties in recording at high speed can be improved by adding trace amounts of elements to the GaGeSbTe recording layer. The amount of such elements is preferably less than 10 atomic percent, and more preferably 4 atomic percent or less relative to GaGeSbTe. By adding trace amounts of Ag, Dy, Mg, Mn, Se, and/or Sn, the crystallization rate of the recording layer can be finely adjusted. Especially, the addition of Mn can increase the crystallization rate, decrease the crystallization temperature as in the addition of Ga to thereby improve the direct overwriting properties at high speed and to facilitate the initialization (an operation in which the recording layer is crystallized after its formation). The amount of Mn is preferably from 1 to 4 atomic percent (from 0.01 to 0.04 in atomic ratio), and more preferably from 1 to 3 atomic percent.

The thickness of the recording layer is optimized according to thermal properties relating to the recording sensitivity and overwriting properties, and optical properties such as modulation factor and reflection ratio. The thickness is preferably from 10 nm to 25 nm, and more preferably from 12 nm to 18 nm. A thickness of the recording layer within this range can provide good overwriting properties in recording at high speed of 20 m/s or more.

The recording layer can be formed by any arbitrary process, of which a vacuum film forming process (gas phase process) is preferred for its minimized contamination of impurities and its applicability to resin substrates. Examples of the vacuum film forming process are sputtering, vapor deposition, chemical vapor deposition (CVD), and ion plating, of which sputtering is preferred for better productivity.

In sputtering, the element composition of a target and that of a formed thin film does not differ from each other so much, and a thin film having a desired composition can be prepared by using a target material having the desired composition. The target can be an alloy target prepared by mixing and dissolving pure substances of constitutional elements at the desired compositional ratios or a target prepared by sintering fine particles of alloys or such pure substances of constitutional elements. In a sintered target, the density of the target is preferably 90% or more, since a sputtering rate, i.e., a thickness of formed film per unit time can be increased with an increased density of the target.

The sputtering target preferably has a composition similar to that of the material for the recording layer of the optical information recording medium. More specifically, the sputtering target preferably mainly comprises Ga, Ge, Sb, and Te and comprises at least one of alloys and intermetallic compounds each having a compositional ratio represented by the following formula:

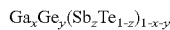

$Ga_xGe_y(Sb_zTe_{1-z})_{1-x-y}$ wherein x, y, and z each represent an atomic ratio of a positive real number less than 1 and satisfy the following conditions:

$0.02 \leq x \leq 0.06$ $0.01 \leq y \leq 0.06$ $0.80 \leq z \leq 0.86$ $x \geq y$ $x+y \leq 0.1$ The content of the at least one of alloys and intermetallic compounds mainly comprising Ga, Ge, Sb, and Te in the sputtering target is preferably 90 atomic percent or more. The at least one of alloys and intermetallic compounds preferably further comprises Mn in an atomic ratio of from 0.01 to 0.03.

The optical information recording medium of the present invention must have a reflective layer on or above the recording layer on opposite side to the substrate. The reflective layer serves to reflect recording light or reproducing light entered from the substrate. Accordingly, materials having a high reflection ratio are preferably used for the reflective layer, of which Au, Ag, Cu, Al, as well as alloys and intermetallic compounds mainly comprising any of these metals are more preferred. The material for the reflective layer may further comprises additional elements such as Au, Ag, Cu, Al, Pt, Pd, Ta, Ti, Co, Mn, Mo, Mg, Cr, Si, Sc, Hf, and other metals.

The reflective layer also serves to dissipate heat applied in the vicinity of the recording layer in recording and/or erasing, in addition to play an optical role of reflecting recording/reproducing light. To record information at high speed, a material having a high crystallization rate must be used for the recording layer, and the medium itself should preferably have a quenching structure. Namely, by using a material having a high thermal conductivity for the reflective layer, marks having a sufficient size can be formed even though a material having a high thermal conductivity is used for the recording layer. Such materials having a high thermal conductivity include, for example, Ag and Ag alloys. In Ag alloys, the content of Ag is preferably 95% by mole or more, and more preferably 99% by mole or more. The aforementioned metals can be used as an additional element for alloys. An excessive amount of such an additional element should be avoided for satisfactory thermal conductivity. If pure Ag is used, its purity is preferably 99.99% by mole or more.

The reflective layer is preferably prepared by a vapor film forming process as with the recording layer. The thickness thereof is set depending on the thermal properties and optical properties as in the recording layer. If the reflective layer is excessively thin, it may transmit the recording/reproducing light, thus failing to ensure sufficient reflection ratio. If it is excessively thick, the medium may have an excessively high heat capacity and may thereby have decreased recording sensitivity. Preferably, the thickness, which should be determined by the thermal properties and optical properties, is from 80 nm to 300 nm, and more preferably from 100 nm to 220 nm.

A protection layer is preferably arranged on both sides of the recording layer. Namely, a lower protection layer 2 is arranged between the recording layer 3 and the substrate 1, and an upper protection layer 4 is arranged between the recording layer 3 and the reflective layer 5, as shown in FIG. 1.

The lower protection layer 2 serves to protect the resinous substrate from heat generated in and in the vicinity of the recording layer in recording, erasing, and rewriting (overwriting). It also serves to increase the contrast based on the amorphous marks recorded in the recording layer by controlling its optical constant (refractive index) and thickness.

A material for the lower protection layer 2 preferably has a high refractive index and a high melting point of 1000° C. or higher and is generally a dielectric. Examples of such dielectrics are oxides, nitrides, sulfides, halides, and other compounds of metals, and inorganic substances such as Si and Ge. Each of these substances can be used alone or in combination.

Examples of the compounds are oxides, sulfides, and carbides of Mg, Ca, Sr, Y, La, Ce, Ho, Er, Ti, Zr, Hf, V, Nb, Ta, Zn, Al, Si, Ge or Pb. Examples of the halides are fluorides of Mg, Ca or Li.

A mixture of ZnS and $SiO_2$ is preferably used as the material for the lower protection layer. The thickness of the lower protection layer is preferably from 40 nm to 200 nm for reducing thermal damage to the resinous substrate and for avoiding mechanical damage such as cracking caused by thermal hysteresis of thermal expansion and thermal contraction in repetitive recording. The thickness is preferably set in the vicinity of such a thickness as to attain minimum reflected light at a reproduction wavelength. Accordingly, the thickness of the lower protection layer is optimally from 50 nm to 90 nm.

The lower protection layer may comprise a single layer or multiple layers. It preferably comprises multiple layers formed from the same material using multiple film forming apparatuses for shorter production time and decreased production cost of the medium. The optical information recording medium may further comprise a layer adjacent to the recording layer for accelerating the crystallization of the recording layer and for thereby ensuring the initialization margin of the medium. Bi and GaN are generally used for the layer for accelerating the crystallization. However, oxides are preferably used in the present invention. Examples of the oxides are $Al_2O_3$, $SiO_2$, $TiO_2$, $ZrO_2$, $Y_2O_3$, and ZnO. These oxides are supposed to be capable of accelerating the crystallization owing to their lattice constants of crystalline phase relatively near to that of SbTe materials. The thickness of the oxide layer is preferably from 1 nm to 5 nm. If it is less than 1 nm, a uniform layer may not be formed, thus inducing nonuniformity in the medium. The sputtering rate for the oxide layer is generally one fifth or less than that for materials for the protection layer such as ZnS. Accordingly, the thickness of the oxide layer is preferably set at the least possible thickness at which crystallization is accelerated effectively.

When the lower protection layer comprises multiple layers, the total thickness of the protection layers is preferably within the above-specified range, and its proportion can be set depending on optical properties, thermal properties, and productivity.

The upper protection layer serves as an interlayer to prevent diffusion of the materials for the recording layer and the reflective layer into each other and as a role to control the thermal properties. The materials for the upper protection layer can be those for the lower protection layer but preferred examples are materials having a low thermal conductivity. If the upper protection layer comprises a material having a high thermal conductivity, the resulting layer may have a decreased thermal efficiency. The application of focused beam thereby does not allow a large volume of the recording layer material to reach its melting point or higher. Thus, the medium may have a decreased sensitivity, may form decreased recording marks and may fail to ensure a sufficient amplitude of reproducing signals.

The thickness of the upper protection layer is preferably from 5 nm to 50 nm, and more preferably from 10 nm to 23 nm. The upper protection layer can comprise multiple layers.

When a sulfide and/or a halide is used for the upper protection layer and Ag or an alloy mainly comprising Ag is used for the reflective layer, the reflective layer may become apt to corrode, and the medium may have decreased storage reliability. To avoid this, it is preferred that the upper protection layer comprises multiple layers including a layer of a material having low corrosion to Ag adjacent to the reflective layer. Examples of such materials are Si, $SiO_2$, SiC, GeN, and GaN. The thickness of the layer is preferably from 2 nm to 10 nm, and more preferably from 2 nm to 5 nm for sufficient reflection ratio of the medium. If it is less than 2 nm, the layer may not serve to prevent corrosion.

An interlayer made of a material for accelerating the crystallization of the recording layer material may be arranged adjacent to the recording layer, as in the lower protection layer.

The optical information recording medium may further comprise an overcoat layer 6 as shown in FIG. 1 for protecting the multiple layers on the substrate from physical and chemical damage. The overcoat layer 6 generally comprises a resin and is preferably prepared by applying and curing, for example, an ultraviolet-curable resin, an electron beam-curable resin, or a thermosetting resin. Among such resin materials, an ultraviolet-curable resin is more preferred for reducing damage to the medium upon film formation. The overcoat layer may be prepared by, for example, dipping or spin coating, of which spin coating is preferred for better uniformity in thickness. When the reflective layer comprises Ag or an alloy mainly comprising Ag, the material for the overcoat layer should preferably be not corrosive to Ag.

The medium may further comprise a multilayer film on the overcoat layer to further protect the medium from physical and chemical damage.

When the recording layer of the prepared medium is amorphous, the recording layer must undergo initialization, in which recording areas are crystallized. The recording layer can be initialized by any method, such as a method in which the recording layer is irradiated, scanned with a high-power laser beam and is crystallized, and a flash method in which the entire medium is irradiated with light.

The method using a high-power laser beam is preferred in which the irradiation energy of the laser beam can be converged to the vicinity of the recording layer by using an objective lens. In addition, the use of a high-power laser beam can increase the diameter of irradiation beam in the vicinity of the recording layer and can increase the scanning speed. The power of the high-power laser beam in terms of power consumption is preferably 500 mW or more, and more preferably 900 mW or more. The laser beam preferably has an oblong shape, longer in a direction perpendicular to the scanning direction for an increased area of a region that can be initialized in one scanning. The laser beam preferably has a length in the scanning direction of from 0.5 μm to 2.0 μm and a width in a direction perpendicular to the scanning direction of from 50 μm to 300 μm. The scanning speed of the beam varies depending on the width and power of the laser beam. The scanning speed can be increased with an increased energy of beam per unit area, that is, with a decreasing diameter and an increasing power of the beam. It is preferably from 1.0 to 12.0 m/s. When a laser beam with power of 900 mW is used, it is optimally from 1.0 to 2.5 m/s.

Information is recorded, erased, reproduced, and/or rewritten on the optical information recording medium by irradiating and scanning the vicinity of the recording layer of the optical information recording medium with focused light. A laser beam is used for recording and reproducing. The wavelength of the laser beam can be set depending on, for example, the recording density. For example, the wavelength may be 780 nm in CD media and 650 nm or 660 nm in DVD media. The numerical aperture NA of the objective lens for focusing the beam is selected depending on the wavelength of the laser beam and the recording density. For example, NA may be 0.50 in CD-R/RW media, 0.55 in double density (DD) CD-RW media, and 0.65 in DVD+R/RW media.

Information to be recorded on the optical information recording medium is modulated by a mark interval and mark length modulation process which is an application of pulse width modulation (PWM) to optical disc media, and then recorded on the medium. Examples of the modulation process are eight to fourteen modulation (EFM) used in compact discs and EFM+, which is an eight to sixteen modulation, used in DVD media.

The information is recorded on the optical information recording medium by applying light having modulated intensity. The intensity can be modulated, for example, by a technique disclosed in JP-A No. 09-219021 or a technique described in the specifications on CD-RW "Orange Book Part III". In the latter technique, the irradiation power is modulated in three values. An example of this technique is shown in FIGS. 2A and 2B. FIG. 2A is a schematic diagram of an amorphous mark to be recorded. An amorphous mark 12 is formed between crystalline portions 11. FIG. 2A is illustrated by taking eight to fourteen modulation (EFM) as an example, and the mark length relative to the reference clocking period Tw is 3Tw, 4Tw, . . . 11Tw. When the mark length is defined as nTw wherein n is 3, 4, . . . 11, the irradiation pattern for use in recording (hereinafter referred to as "recording strategy") is illustrated in FIG. 2B. With reference to FIG. 2B, the irradiation power is modulated into three values, Pw>Pe>Pb, and the number of pulses with a power of Pw is n−1.

The parameters of this recording method are represented by Ttop, dTtop, Tmp, and dTera.

In this recording method, there is the case where the response time of the laser beam does not catch up with the interval, i.e., the pulse width in high-speed recording in which the reference clocking period in recording becomes short. At a speed corresponding to 24× speed in CD media, the reference clocking period is 9.6 ns, and the clocking frequency is 104 MHz. In this case, the rise and fall times of emission of the laser beam must be 1 ns or less.

To record information at high speed using a laser beam having long rise and fall times, U.S. Pat. No. 5,732,062 discloses a technique in which the number of pulses is reduced. Specifically, when m pulses are used for the formation of nTw marks, n and m satisfy the following conditions: n=2 m when n is an even number, and n=2 m+1 when n is an odd number. By using this recording strategy, information can be recorded at a speed corresponding to 24× speed even though a laser beam has rise and fall times as much as 2 ns.

An example of the strategy is show in FIG. 3, which is in the eight to fourteen modulation (EFM) as in FIGS. 2A and 2B.

Information is recorded on the optical information recording medium at a scanning speed of 9.6 m/s to 33.6 m/s and a reference clocking period of 9.6 ns to 29.0 ns. The information of the scanning speed during recording is preferably preformatted on the optical information recording medium. Namely, the information on the scanning speed at which recording can be performed is preferably added to the optical information recording medium before target information is recorded thereon.

The scanning speed information can be preformatted by any method such as a method in which the information is preformatted on the substrate itself and a method in which the information is recorded on a part of the medium using a recording apparatus. It is preformatted on the substrate, for example, by a technique of forming emboss pits on the substrate or a technique of inputting the information to wobbling of the groove on the substrate. Among these methods, the method of preformatting the information on the substrate is preferred for better production of the medium. In the technique of forming emboss pits, the emboss pits and the groove have different optimum depths, inviting problems in processing of the substrate or stamping for the formation of the substrate. Accordingly, the technique of preformatting the information into wobbling of the groove is most preferred.

For example, information on the scanning speed or appropriate recording conditions is preformatted instead of the address information according to the procedure of ATIP or ADIP. Examples of preformatted information on scanning speed in ATIP are highest testing speed (HTS) and lowest testing speed (LTS) in CD-R and CD-RW media. Examples of preformatted information using ADIP are maximum recording velocity and reference recording velocity in DVD+R media. A recording apparatus reads out the information on the scanning speed from the optical information recording medium to thereby set an appropriate recording scanning speed.

The information on the scanning speed may be written on the medium in a format which uniquely determines the information. A multiple of the main scanning speed is preformatted in CD-R and CD-RW media in ATIP. In this case, the scanning speed can be determined based on the preformatted information, since the main scanning speed in CD media is defined at 1.2 m/s to 1.4 m/s. For example, the scanning speed is 28.8 m/s to 33.6 m/s when the preformatted multiple of the scanning speed is 24×.

The aforementioned speed range must include a range at which.recording can be performed according both to the recording strategy where m=n−1 and to the strategy where n=2 m or n=2 m−1. The recording according to the recording strategy where m=n−1, i.e., n=m+1, is preferably performed at a relatively low recording speed, and is more preferably performed at a speed corresponding to the 16× speed or less in CD media, namely at a scanning speed of 22.4 m/s or less and a reference clocking period Tw of 14.4 ns or more.

EXAMPLE

The present invention will be illustrated in further detail with reference to several examples and comparative examples below, which are never intended to limit the scope of the present invention.

Example 1

A disc was prepared by sequentially forming a lower protection layer, a recording layer, an upper protection layer, a reflective layer, and an overcoat layer on a polycarbonate transparent substrate having a transferred spiral continuous groove in the following manner.

The substrate used was a substrate for CD-RW having an outer diameter of 120 mm and a thickness of 1.2 mm. It had been prepared by injection molding and had a spiral continues groove transferred by using a stamper. The transferred groove on the substrate was observed on an atomic force microscope (AFM) and was found to have a groove width of 620 nm and a groove depth of 40 nm. The groove was wobbled so that the average frequency was 22.05 kHz upon scanning at a linear velocity of 1.2 m/s. Address information was preformatted on the wobbling by frequency modulation. The modulation method and address information were according to the international standard specifications on CD-RW, "Orange Book" Recordable Compact Disc Systems Part III, Volume 2, Ver. 1.1.

To ensure the recording and reproducing reliability of the resulting medium, the birefringence of the substrate was controlled so as to be 40 nm or less at a recording/reproducing wavelength, 780 nm, by controlling the injection speed of a material resin and the temperature of a mold in injection molding.

The substrate was annealed at 60° C. for 12 hours before formation of other layers mentioned below to thereby remove adsorbed or absorbed moisture from the substrate sufficiently.

Next, the lower protection layer comprising a mixture of ZnS and SiO$_2$ was formed on the transparent substrate. The molar ratio of ZnS to SiO$_2$ was 80:20. The lower protection layer was prepared by RF magnetron sputtering, a kind of a vacuum film forming process, using inert Ar gas as a sputtering gas at a power of a high-voltage power source of 4 kW and an inflow of Ar gas of 15 sccm (standard cubic centimeter per minute). The formed lower protection layer had a thickness of 75 nm.

On the lower protection layer, the recording layer comprising a material represented by the following compositional formula was formed using a sputtering target represented by the following compositional formula:

$$Ga_xGe_y(Sb_zTe_{1-z})_{1-x-y}$$

wherein x, y, and z are atomic ratios shown below.

x=0.038 y=0.030 z=0.815

The recording layer was formed by DC magnetron sputtering using the GaGeSbTe alloy target with Ar gas as a sputtering gas at an inflow of 20 sccm and a sputtering power of 400 W. The formed recording layer had a thickness of 16 nm.

The upper protection layer was formed on the recording layer using the same material as in the lower protection layer. The upper protection layer 18 nm thick was formed by RF magnetron sputtering using Ar gas at a sputtering power of 1.5 kW.

A film of Si was formed to a thickness of 4 nm on the upper protection layer for preventing sulfuration of Ag. The material Si had a purity of 99.99%. The Si film was formed by DC magnetron sputtering as in the recording layer at a sputtering power of 0.5 kW.

An Ag reflective layer was formed to a thickness of 140 nm on the Si layer by DC magnetron sputtering using a target having a purity of 99.99% or more. The DC magnetron sputtering was performed at an inflow of Ar gas into sputtering chamber of 20 sccm and a sputtering power of 3 kW.

The thicknesses of the above-prepared five thin films were optically measured values using a spectro-ellipsometer. The thin films were formed using a sheet-fed sputtering apparatus. The apparatus was set so that the thin films layers were not exposed to the air during their formation for preventing chemical reactions such as oxidation of the recording layer or adsorption of gas.

The overcoat layer was formed on the reflective layer using a commercially available coating material for optical discs (an UV curable resin SD 318, available from Dainippon Ink and Chemicals, Inc., Japan). A film of the coating material was applied by spin coating and was cured by irradiation with an UV lamp. The formed overcoat layer had a thickness of 8 μm in an inner circumference of the medium and of 14 μm in an outer circumference thereof.

The recording layer of the above-prepared optical information recording medium (optical disc) was in quenching condition after sputtering and in an amorphous phase entirely. The recording layer was therefore initialized by irradiating and scanning with a high power laser beam at a power of 900 mW. The objective lens of the laser apparatus was adjusted so that the laser beam was focused in the vicinity of the recording layer of the optical information recording medium to be elliptical. The elliptically focused beam had a minor axis in agreement with the scanning direction, namely, the circumferential direction of the disc. The beam had a minor axis of 1 μm and a major axis of 90 μm when the edge of the beam was defined as a position where the beam had an intensity of $1/e^2$ times as much as the peak intensity, wherein e is the base of natural logarithms. The entire optical information recording medium was initialized by spirally scanning with the laser beam at a scanning speed of 2 m/s. The pitch of spiral, i.e., the shift in a radius direction per rotation, was set at 45 μm so that one area was scanned with the laser beam twice.

The initialized optical disc was an unrecorded CD–RW medium satisfying mechanical properties and unrecorded signaling properties specified in Orange Book Part III.

Information was recorded and overwritten on the above-prepared optical disc, and its recording signaling properties were evaluated using an optical disc tester DDU-1000 (trade name, available from Pulstec Industrial Co., Ltd., Japan). The optical pickup of the tester had a NA of 0.50, λ of 789 nm, and a maximum emission power of 35 mW. In the apparatus, the number of revolutions of a tested optical disc can be up to 6000 rpm, corresponding to 30× speed in compact disc media.

Figure 4:
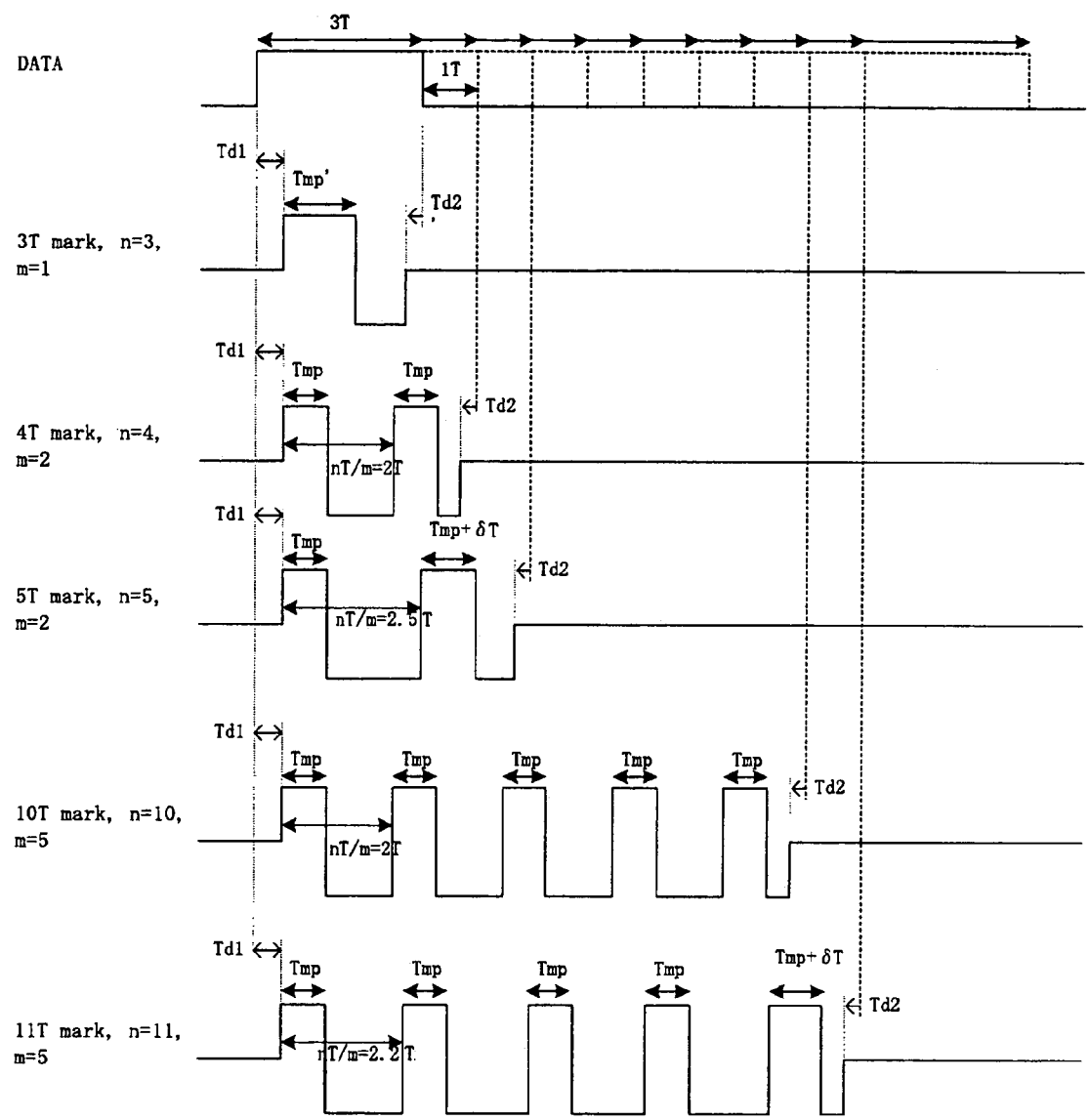
FIG. 4 is a diagram showing a recording strategy used in evaluation of recording signaling properties of an optical information recording medium according to Example 1.

A recording strategy shown in FIG. 4 was used, in which the pulse emission period was set at nT/m wherein m is the number of pulses; and nT is the reference clocking period of a mark to be recorded. The parameters of the recording strategy were as follows. The symbol "T" in the figure has the same meaning as Tw.

Tmp=1.0T

Tmp'=1.6T

Td1=0.5T

Td2=0T

δ=0.125T

Scanning speed: 28.8 m/s (corresponding to 24× speed in CD media)

Reference clocking period T=9.64 ns

The recording powers Pw, Pe, and Pb were set as follows.

Pw=33 mW

Pe=11 mW

Pb=0.5 mW

A pattern according to the rule in EFM was recorded as the information.

The recording procedure by direct overwriting was repeated up to a total of 1000 times. During this procedure, the recording signal of the optical disc was evaluated on 11T modulation factor, 3T mark jitter, and 3T space jitter using the same apparatus at a scanning speed of 1.2 m/s corresponding to 1× speed in CD media. These parameters are specified in the standard specification of CD–RW as follows:

11T modulation factor: 0.55 to 0.70

Jitter: 35 ns or less

Figure 5:
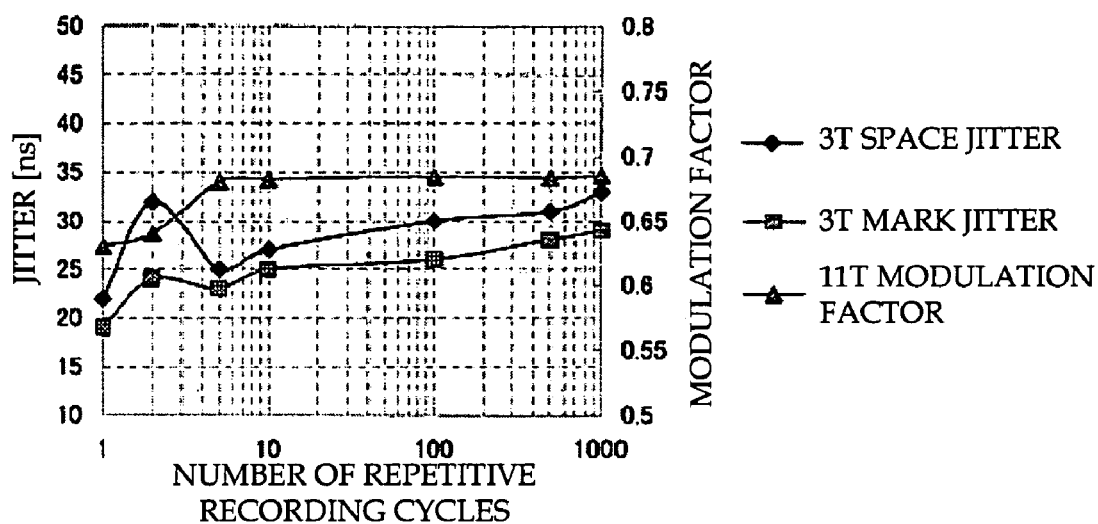
FIG. 5 is a graph showing properties of the optical information recording medium of Example 1 measured at a scanning speed of 28.8 m/s.

The results are shown in FIG. 5, indicating that the optical disc yields good results satisfying the standard specification from 1 to 1000 repetitive recording cycles.

The pattern was recorded and signaling properties of the same optical disc subjected to evaluation were determined by the above procedure, except that the parameters of the recording strategy and the recording powers Pw, Pe, and Pb were changed as follows.

Tmp=0.5T

Tmp'=0.8T

Td1=0.5T

Td2=0T

δ=0.125T

Figure 6:
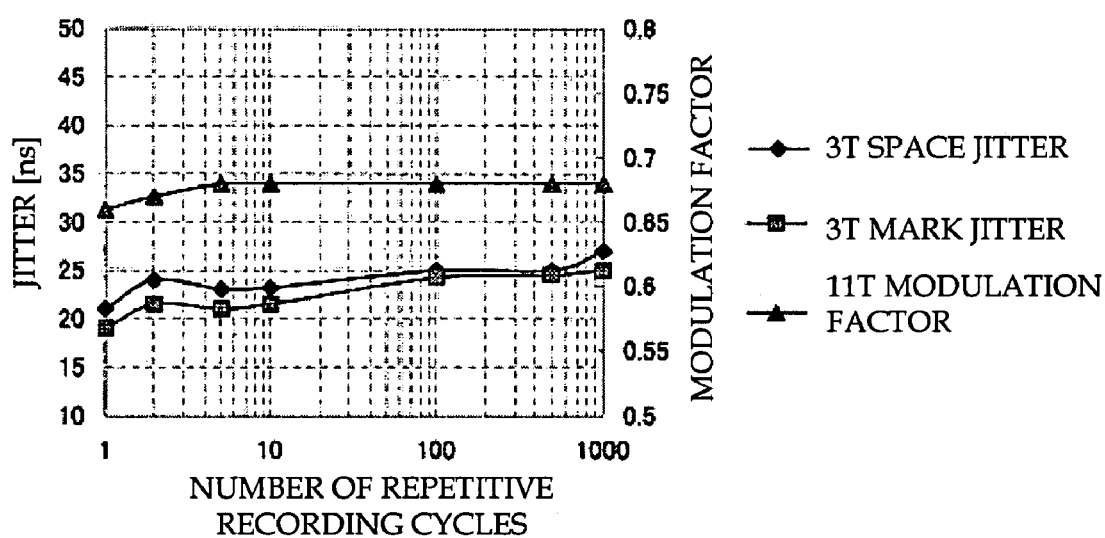
FIG. 6 is a graph showing properties of the optical information recording medium of Example 1 measured at a scanning speed of 9.6 m/s.

Scanning speed: 9.6 m/s (corresponding to 8× speed in CD media)
Reference clocking period T: 28.9 ns Pw=30 mW Pe=10 mW Pb=0.5 mW The results are shown in FIG. 6, indicating that the optical disc yields good results satisfying the standard specification from 1 to 1000 repetitive recording cycles.

The same optical disc as above was kept at 80° C. and a relative humidity of 85% for 300 hours, and the 3T jitter in the record was determined and was found to be 35 ns or less, indicating that the optical disc has sufficient storage reliability.

Thus, the prepared CD-RW disc is capable of directly overwriting at 8× to 24× speed and has sufficient storage reliability.

Comparative Example 1

An optical disc was prepared and was initialized by the procedure of Example 1, except that a material for the recording layer had the following atomic ratios.

x=0.029 y=0.039 z=0.820

However, the optical disc invited noise on reproducing signals before recording. A pattern was recorded on the optical disc by the procedure of Example 1 at a scanning speed of 28.8 m/s and its properties were evaluated. The jitter in the first recording cycle exceeded 35 ns, which was out of the specification. This is probably because the amount of Ge exceeds that of Ga (x<y), and the recording layer has an excessively high crystallization temperature to thereby fail to form a uniform crystalline phase.

Comparative Example 2

An optical disc was prepared by the procedure of Example 1, except that a material for the recording layer had the following atomic ratios.

x=0.016 y=0.049 z=0.793

The prepared optical disc was initialized by the procedure of Example 1, except that the scanning speed was set at 4.0 m/s.

A pattern was recorded on the optical disc, and its signaling properties were determined by the procedure of Example 1, except that the parameters of the recording strategy and the recording powers Pw, Pe, and Pb were changed as follows.

Tmp=1.0T

Tmp'=1.6T

Td1=0.5T

Td2=0T

δ=0.125T

Scanning speed: 28.8 m/s (corresponding to 24× speed in CD media)
Reference clocking period T=9.64 ns Pw=30 mW Pe=10 mW Pb=0.5 mW In the first recording cycle, the optical disc showed good results of a 3T space jitter of 20 ns and a 3T mark jitter of 19 ns. However, in the second recording (overwriting), the optical disc showed a space jitter and a mark jitter of about 42 ns, and therefore it was confirmed that information cannot be overwritten on the optical disc at a speed corresponding to 24× speed in CD media.

Example 2

An optical disc was prepared by the procedure of Example 1, except that a material having the following compositional formula was used for the sputtering target for the formation of the recording layer.

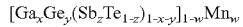
$[Ga_xGe_y(Sb_zTe_{1-z})_{1-x-y}]_{1-w}Mn_w$

Wherein x=0.038 y=0.030 z=0.815 w=0.02

The prepared optical disc was initialized by the procedure of Example 1, except that the scanning speed was set at 2.5 m/s.

Figure 7:
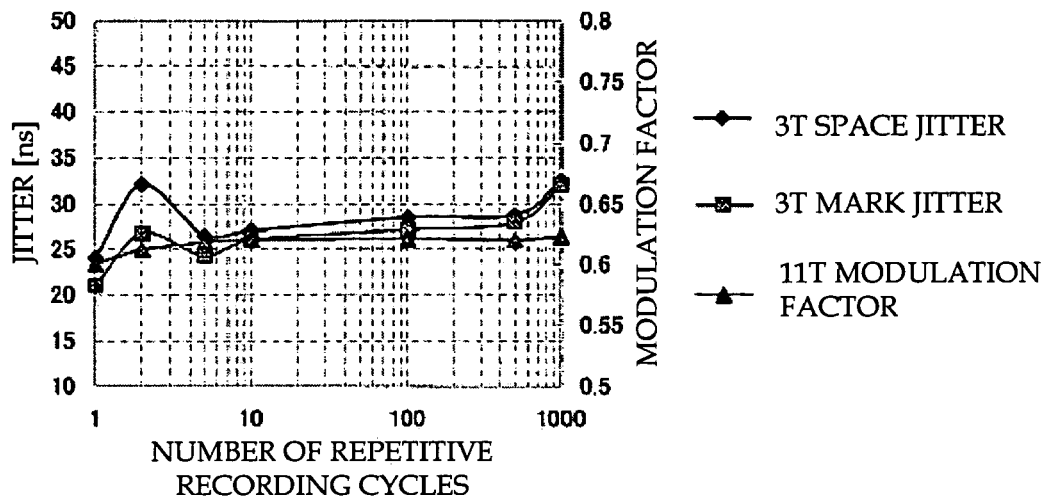
FIG. 7 is a graph showing properties of an optical information recording medium of Example 2 measured at a scanning speed of 28.8 m/s.
Figure 8:
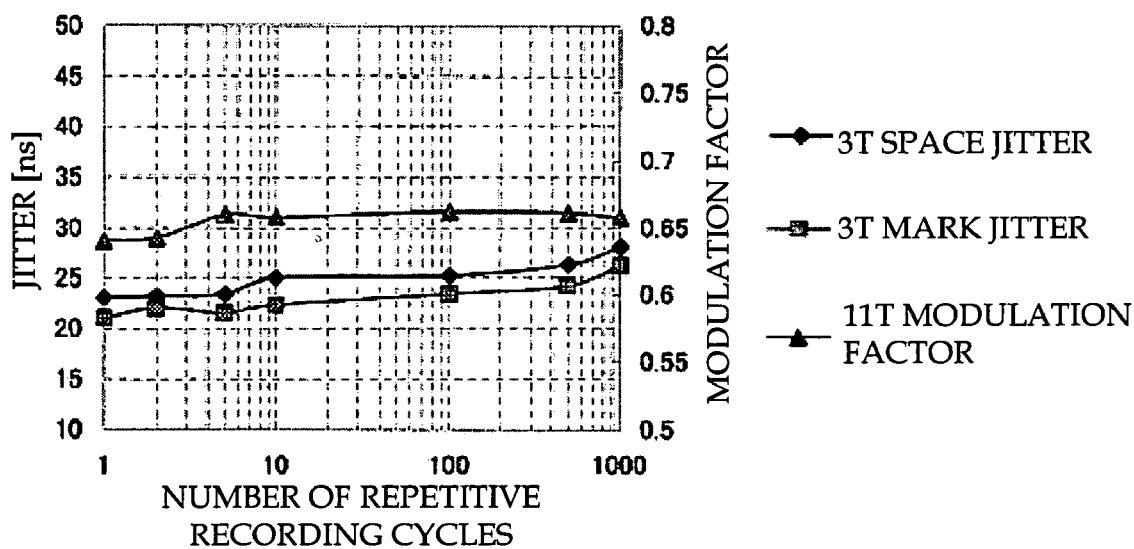
FIG. 8 is a graph showing properties of the optical information recording medium of Example 2 measured at a scanning speed of 9.6 m/s.

A pattern was recorded on the initialized optical disc, and its signaling properties were determined by the procedure of Example 1. FIGS. 7 and 8 show the results at a scanning speed of 28.8 m/s and at a scanning speed of 9.6 m/s, respectively. As shown in the figures, the optical disc had good results at both speeds, indicating that the addition of Mn to the recording layer ensures good properties in recording at higher scanning speed.

Example 3

An optical disc was prepared by the procedure of Example 1, except that an oxide layer comprising $ZrO_2$ (77% by mole), TiO$_2$ (20% by mole), and Y$_2$O$_3$ (3% by mole) was formed between the lower protection layer and the recording layer. The oxide layer was formed by RF magnetron sputtering as in the lower protection layer.

The prepared optical disc was initialized by the procedure of Example 1, except that the scanning speed was set at 2.5 m/s. Noise on reproducing signals of the optical disc before recording was determined and was found to be substantially equal to that of the optical disc according to Example 1. A pattern was recorded on the optical disc by the procedure of Example 1 at a scanning speed of 28.8 m/s, and its signaling properties were determined. The optical disc had a reduced jitter in the first recording of 23 ns.

The results verify that the optical disc can be initialized at higher scanning speed by forming an oxide layer adjacent to the recording layer.

Comparative Example 3

An optical disc was prepared by the procedure of Example 1, except that a material for the recording layer had the following atomic ratios.

x=0.072 y=0.029 z=0.790

(x+y=0.101)

The prepared optical disc was initialized by the procedure of Example 1, except that the scanning speed was set at 2.0 m/s.

The initialized optical disc had a low reflection ratio of 0.14 before recording and did not satisfy the standard specification of from 0.15 to 0.25.

A pattern was recorded on the optical disc by the procedure of Example 1 at a scanning speed of 28.8 m/s and the properties were evaluated. The jitter in the second recording cycle exceeded 50 ns, showing that the optical disc cannot have satisfactory properties.

This is probably because the total of x and y (x+y) exceeded 0.1, and the recording layer thereby has an excessively high absorption coefficient and has a decreased reflection ratio, and the optical disc cannot have satisfactory overwriting jitter.

Comparative Example 4

An optical disc was prepared and initialized by the procedure of Example 1, except that a material for the recording layer had the following atomic ratios.

x=0.048 y=0.031 z=0.863

A pattern was recorded on the optical disc by procedure of Example 1 at a scanning speed of 28.8 m/s and its properties were evaluated. As a result, the optical disc had a 11T modulation factor of 0.42, showing that the optical disc cannot have a sufficient reproducing signal amplitude.

Example 4

An optical disc was prepared and initialized by the procedure of Example 1, except that the initialization was performed under the following conditions.

Initialization power: 900 mW
Scanning speed: 3.0 m/s
Shift in radius direction per one rotation: 20 µm A pattern was recorded on the optical disc and by procedure of Example 1 at a scanning speed of 28.8 m/s and the signaling properties of the optical disc were determined. The jitter after ten overwriting cycles was as good as 30 ns. In contrast, reproducing signals before recording showed noise caused by the fine structure of crystals, and the jitter of the optical disc in the first recording cycle was 32 ns, higher than in the optical discs according to Examples 1 to 3.

Comparative Example 5

An optical disc was prepared by the procedure of Example 1, except that InGeSbTe having the following compositional formula was used as the material for the recording layer, namely Ga in the material in Example 1 was replaced with In.

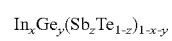

In$_x$Ge$_y$(Sb$_z$Te$_{1-z}$)$_{1-x-y}$

Wherein x, y, and z are atomic ratios as follows.

x=0.035 y=0.02 z=0.802

A pattern was recorded on the above-prepared optical disc once by the procedure of Example 1, and the recorded optical disc was kept at a temperature of 80° C. and a relative humidity of 85% for 300 hours. The optical disc showed a jitter of 23 ns before the environmental test but a markedly deteriorated jitter of 42 ns after the test.

The same optical disc was subjected to two recording cycles, i.e., one overwrite procedure, by the procedure of Example 1 at a scanning speed of 28.8 m/s and showed a jitter of 45 ns, which was significantly out of the specification.

These results show that the use of In instead of Ga fails to ensure satisfactory storage reliability and overwriting properties.

The present invention can yield the following advantages. Information can be recorded by direct overwriting with good properties at a scanning speed ranging from 9.6 to 33.6 m/s, corresponding to 8× to 24× speed in CD–RW media, and the recorded information can have a satisfactory storage life. The crystallization temperature of the recording layer can be decreased, and the recording layer can be crystallized upon irradiation with a high-power laser beam. Thus, reproducing signals with low noise, high signal-to-noise ratio and uniform reflection ratio can be obtained. Information can be recorded, erased and/or rewritten at an appropriate scanning speed. The recording layer can be easily quenched upon recording and/or rewriting of information, due to an increased thermal conductivity of the reflective layer. The recording layer can thereby be converted into an amorphous phase even when sufficient energy is not applied to the medium in recording at high scanning speed of 20 m/s or more. Thus, the optical information recording medium can have a good recording sensitivity even in high-speed recording. By arranging an oxide film layer adjacent to the recording layer, the crystallization of the recording layer can be further accelerated. The scanning speed of a high-power laser beam in an initialization process of the optical information recording medium is optimized, and sufficient energy can be applied to the material for the recording layer to make more uniform with less optical anisotropy and to reduce noise in the reproducing signals. In addition, the present invention provides a sputtering target for the formation of the recording layer of the optical information recording medium and provides an appropriate method for recording information on the optical information recording medium of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical information recording medium comprising:
a transparent substrate;
a recording layer disposed on the transparent substrate; and
a reflective layer disposed on the recording layer,
the optical information recording medium being capable of performing, at a linear recording velocity of 28.8 m/s to 33.6 m/s, at least one of recording, erasing and rewriting information by irradiating and scanning with focused light to thereby form and erase recording marks on the recording layer,
wherein the recording layer comprises at least one of alloys and intermetallic compounds each mainly comprising Ga, Ge, Sb, Te and Mn in a compositional ratio represented by the following formula:

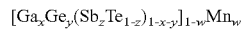

wherein x, y, z and w each represent an atomic ratio of a positive real number less than 1 and satisfy the following conditions:

$0.02 \leq x \leq 0.06$ $0.01 \leq y \leq 0.06$ $0.815 \leq z \leq 0.86$ $x \geq y$ $x+y \leq 0.1$ and $0.1 \leq w \leq 0.4$.

2. An optical information recording medium according to claim 1, wherein the content of the at least one of alloys and intermetallic compounds each mainly comprising Ga, Ge, Sb, and Te in the recording layer is 90 atomic percent or more.

3. An optical information recording medium according to claim 1, wherein the recording layer has a thickness of 10 nm to 25 nm.

4. An optical information recording medium according to claim 1, having a preformatted scanning speed of at least one of recording, erasing and rewriting procedures, and wherein the preformatted scanning speed is from 9.6 m/s to 33.6 m/s.

5. An optical information recording medium according to claim 1, wherein the reflective layer comprises at least one of Ag and an alloy comprising 95% by mole or more of Ag.

6. An optical information recording medium according to claim 1, wherein the reflective layer has a thickness of 80 nm to 300 nm.

7. An optical information recording medium according to claim 1, further comprising an oxide layer adjacent to at least one side of the recording layer, the oxide layer mainly comprising at least one oxide and having a thickness of 1 nm to 5 nm.

8. An optical information recording medium according to claim 7, wherein the oxide layer mainly comprises at least one selected from the group consisting of $Al_2O_3$, $SiO_2$, $TiO_2$, $ZrO_2$, $Y_2O_3$, and ZnO.

9. An optical information recording medium according to claim 1, further comprising at least one protection layer having a thickness of 5 nm to 50 nm.

10. An optical information recording medium according to claim 1, which can undergo initialization by irradiating and scanning with a laser beam having a power consumption of 500 mW or more at a scanning speed of 1 m/s to 2.5 m/s.

* * * * *

UNITED STATES PATENT AND TRADEMARK OFFICE
CERTIFICATE OF CORRECTION

| | | |
|---|---|---|
| PATENT NO. | : 7,351,516 B2 | Page 1 of 1 |
| APPLICATION NO. | : 10/699878 | |
| DATED | : April 1, 2008 | |
| INVENTOR(S) | : Masaki Kato et al. | |

It is certified that error appears in the above-identified patent and that said Letters Patent is hereby corrected as shown below:

Item no. [45], change "Date of Patent: Apr. 1, 2008" to --**Date of Patent: *Apr. 1, 2008**--.

Item (*) Notice, change "Notice:     Subject to any disclaimer, the term of this patent is extended or adjusted under 35 U.S.C. 154(b) by 440 days" to
--Notice:     Subject to any disclaimer, the term of this patent is extended or adjusted under 35 U.S.C. 154(b) by 440 days. This patent is subject to a terminal disclaimer.--

Signed and Sealed this

Twenty-sixth Day of August, 2008

JON W. DUDAS
*Director of the United States Patent and Trademark Office*